INVENTOR
Stanley R. Tyler
BY
Christensen Sanborn
and Matthews
ATTORNEY

United States Patent Office 3,570,248
Patented Mar. 16, 1971

3,570,248
LIQUID FUEL SUPPLY SYSTEM FOR A GAS TURBINE ENGINE
Stanley R. Tyler, Cheltenham, England, assignor to Dowty Fuel Systems Limited, Cheltenham, England
Filed Apr. 25, 1969, Ser. No. 819,189
Claims priority, application Great Britain, May 6, 1968, 21,396/68
Int. Cl. F02k 1/16, 1/18, 3/10
U.S. Cl. 60—237                      5 Claims

ABSTRACT OF THE DISCLOSURE

A liquid fuel supply system for an aircraft gas turbine engine has a centrifugal pump arranged to supply fuel to reheat burners at a rate which is regulated by a first flow control means, and arranged also to supply liquid fuel for operating an auxiliary power service which includes a second flow control means controlling a variable area discharge nozzle of the engine. The centrifugal pump has a turbine drive to which the supply of compressed air is regulated by a valve in response to the total flow demand of the first and second flow control means.

FIELD OF THE INVENTION

Liquid fuel supply systems for gas turbine engines.

DESCRIPTION OF THE PRIOR ART

In United States specification Ser. No. 3,391,541 a liquid fuel supply system for gas turbine engines is described in which the delivery of fuel to reheat burners from an engine-driven centrifugal pump is regulated by a controllable inlet valve, and in which an auxiliary circuit, supplying an auxiliary power service controlling a variable area discharge nozzle, includes a branch pipe leading from the pump delivery, a return pipe connected to the inlet of the centrifugal pump downstream of the inlet valve, and a control valve operable to vary the flow of liquid from the branch pipe to the auxiliary power service, and therefore the return flow of liquid from the auxiliary power service through the return pipe to the pump inlet.

The system described has the advantage that only one pump is used to supply fuel to the reheat burners, and to provide the fluid power necessary for causing changes of nozzle area so that a given turbine pressure ratio is substantially maintained in spite of changes in reheat fuel flow. When there is no demand for reheat, the pump is continuously running and the supply of fuel to the pump inlet is shut down or substantially so, while arrangements have to be made for venting any small flow fuel entering the pump, and for preventing temperature rise in the pump.

The present invention provides a single supply pump having a fluid-operated drive which is inoperative when there is no flow demand from the pump.

SUMMARY OF INVENTION

A liquid fuel supply system for a gas turbine engine comprises a centrifugal pump arranged to supply liquid fuel under pressure to burner means and for operation of an auxiliary power service, fluid-operated drive means for the pump, valve means operable to vary the fluid supplied to the drive means, a first flow control means operable to regulate the flow of fuel to the burner means, and a second flow control means operable to regulate the flow of fuel to the auxiliary power service, the valve means being arranged to vary the fluid supplied to the drive means in accordance with the flow of fuel demanded by the first flow control means and the flow of fuel demanded by the second flow control means.

Figure 1:
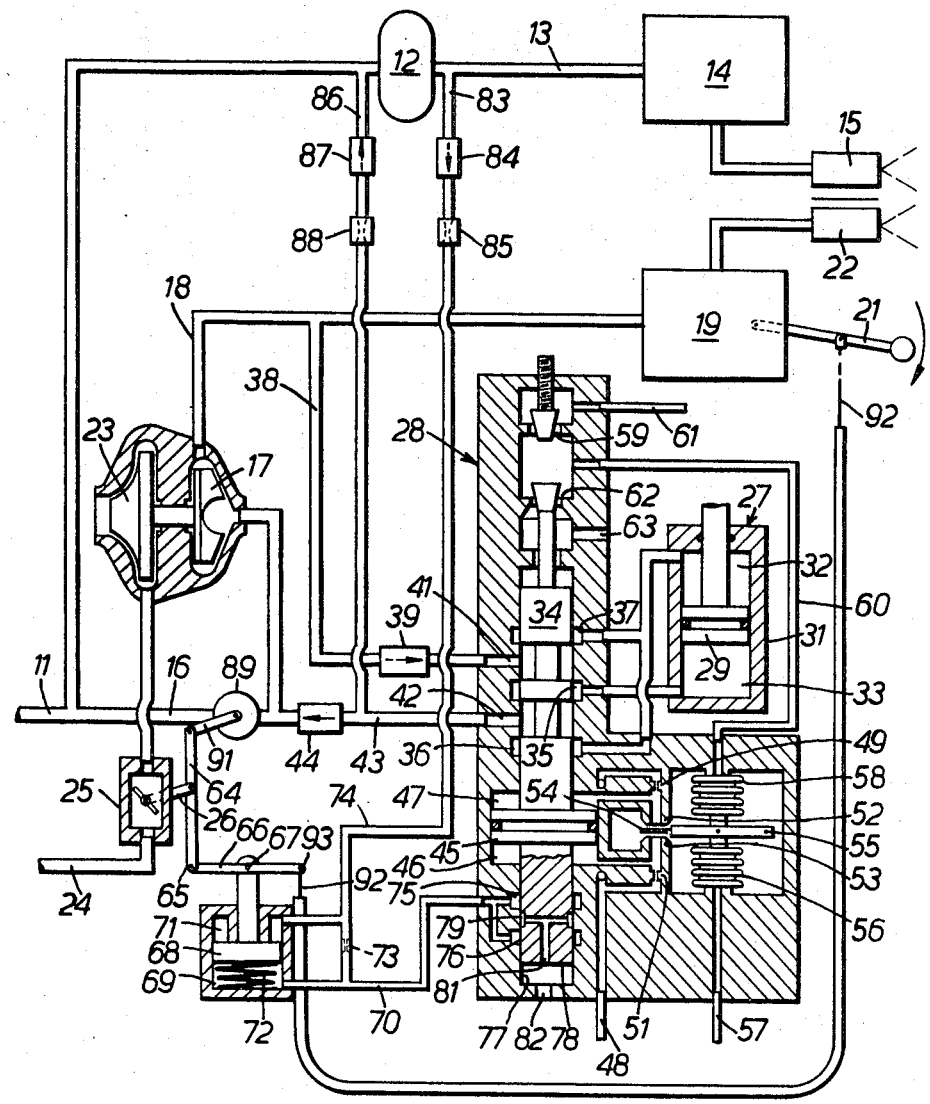
Figure 2:
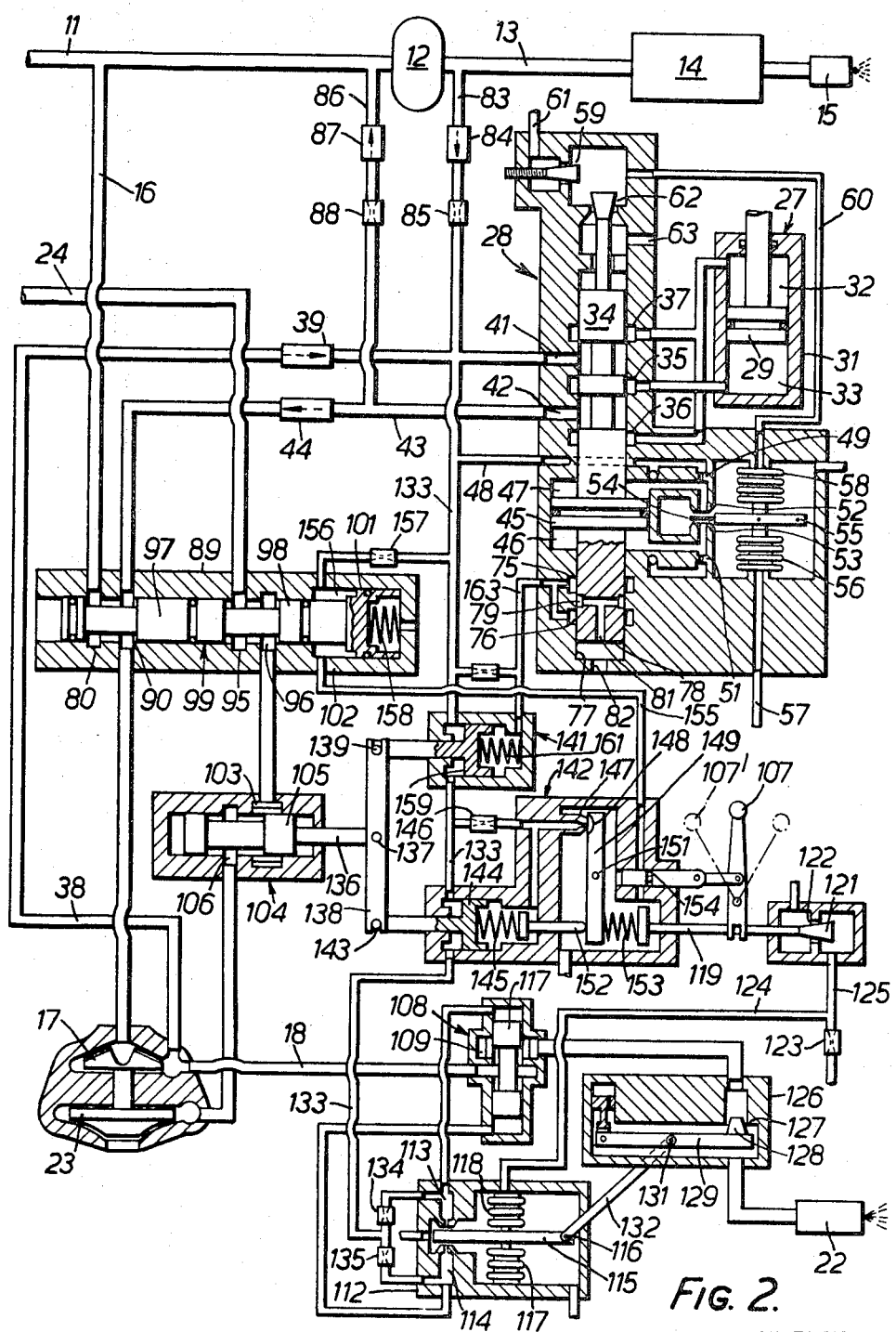

In the accompanying diagrammatic drawings:
FIG. 1 shows one form of liquid fuel supply system for a gas turbine engine in accordance with the invention, and
FIG. 2 shows another embodiment of the invention.

In FIG. 1, a fuel supply pipe 11 leads to a main pump 12 which may be a gear pump, the delivery from which flows through a pipe 13 and through flow control means 14 to main engine burners one of which is shown at 15. The flow pressure supply pipe 11 has also a branch 16 supplying the inlet of a centrifugal pump 17. A delivery pipe 18 from the latter leads to flow control means 19 which includes a manual control lever 21 while the delivery from the control means supplies reheat fuel burners one of which is shown at 22. The centrifugal pump 17 has fluid-operated drive means provided by an air turbine 23 which is supplied from the compressor stage of the engine through a pipe 24 having valve means in the form of a butterfly type valve 25 interposed therein. The valve member has a control lever 26 operated in a manner which will be described.

The centrifugal pump also supplies an auxiliary power circuit operating a number of jacks which control the area of the discharge nozzle of this engine. One jack 27 of a number of such jacks is shown under the control of another flow control means 28. The nozzle control jack 27 shown has a piston 29 working in a cylinder 31 having an annular chamber 32 to which fuel under pressure is admitted to contract the jack 27 and reduce the area of the engine discharge nozzle, and a circular chamber 35 to which fuel under pressure is admitted for extending the jack and enlarging the engine discharge nozzle. The valve unit 28 includes a valve spool 34 which in its central position closes a fluid supply port 35 leading to the chamber 33 and also two inter-connected supply ports 36 and 37 which lead to the chamber 32. A branch 38 from the delivery pipe 18 leads through a non-return valve 39 to an inlet 41 in the valve bore between the ports 35 and 37. A return flow outlet 42 opens from the valve bore between the ports 35 and 36 and leads by way of a pipe 43 having a non-return valve 44 therein to the branch pipe 16 which is connected to the centrifugal pump inlet.

The valve spool 34 is servo-operated by a piston 45 on its lower end portion which works in a bore having chambers 46 and 47 on opposite sides of the piston 45. The servo pressure for operation of the piston 45 may be derived from the delivery side of the main pump 12, and it is supplied through a pipe 48 which is branched through restrictors 49 and 51 to nozzles 52 and 53. The nozzles are variably restricted by a flapper 54 which at one end extends between the nozzles and which is pivoted at its other end 55. Movement of the flapper 54 is controlled by the opposed capsules one of which 56 is supplied with jet pipe pressures through a connecting pipe 57, and the other of which 58 is supplied with a variable proportion of compressor delivery pressure by way of a delivery pipe 60. The pipe 60 leads from a tapping between a pre-set restrictor 59, the upstream side of which is supplied with compressor delivery pressure 61, and a variable restrictor 62, the downstream end of which is connected to low pressure through a vent passage 63. The variable restrictor is provided by a fixed orifice and a profiled plug which is movable with the valve spool 34.

The butterfly valve 25 controls the speed of the air turbine 23 and therefore the delivery pressure of the centrifugal pump 17 in response to input signals. For this purpose the lever 26 is connected to a link 64 having a pivotal connection 65 at one end of a lever 66 which forms a summing device. The intermediate part of the lever has a pivotal connection 67 to a servo piston 68 which works in a cylinder having chambers 69 and 71 in which fluid pressure can be varied. A spring 72 in the chamber 69 acts upwardly on the piston 68. The fluid pressures in the chambers 71 and 69 are those upstream and downstream of a fixed restrictor 73 through which fluid flows from the branch pipe 38 by way of a further branch pipe 74. A pipe 70 forms part of a control connection between the flow control means and the valve 25. The pipe 70 leads from the chamber 69 to two axially spaced grooves 75 and 76 in a bore 77 of the value unit 28. A piston rod 78 extending from the lower end of the piston 45 slides in the bore 77 and it has a groove 79 therein which connects with one or other of the grooves 75 or 76 when the valve spool 34 moves in either direction from the neutral position. The groove 79 is connected by a central passage 81 in the piston rod to the lower end of the bore 77 which is vented at 82 to the low pressure side of the fuel system.

Considering the supply of reheat fuel to the burners 22 only, movement of the control lever 21 in a clockwise direction causes the flow control means 19 to increase the regulated flow rate, and at the same time acts through a control connection, which is shown for simplicity as a Bowden cable 92, to raise the end 93 of the lever 66. With the piston 68 stationary, the other end 65 of the lever lowers and acts through the lever 26 to open the valve 25. The resulting increased air flow drives the turbine 23 at increased speed and therefore increases the delivery pressure of the centrifugal pump 17 to meet the increased flow demand.

Considering now the operation of the control valve unit 28. If the reheat fuel flow is changed there will be a resulting change in the ratio of compressor delivery pressure to jet pipe pressure, requiring a compensating change in nozzle area. An increase in jet pipe pressure in the pipe 57 and capsule 56 loads the flapper 54 against the nozzle 52 to increase pressure in the chamber 47. The piston 45 therefore moves downwardly to open a connection between the pressure port 41 and the supply port 35, and a connection between the supply port 36 and the return port 42. The piston 29 extends from the cylinder 31 to enlarge the nozzle. Downward movement of the valve spool 34 causes the restrictor 62 to be increasingly throttled and so increase pressure in the capsule 58, whereby the flapper 54 is returned towards a mid-position between the nozzles 52, 53. The plug in the variable restrictor 62 is shaped so that the displacement of the valve spool 34 from its neutral position is proportional to the change in the ratio of compressor delivery pressure to jet pipe pressure. This displacement determines the speed at which the piston 29 of the jack 27 moves upwardly to increase the area of the engine discharge nozzle.

When the nozzle area increases, the pressure ratio returns towards its original value, and the resulting pressure change in the capsule 56 provides a feedback which biases the flapper 54 to restore the valve spool 34 to its neutral position.

The nozzle area is therefore determined by the ratio between compressor delivery pressure and jet pipe pressure. By similar reasoning it can be shown that a decrease in jet pipe pressure causes a corresponding decrease in nozzle area.

It will be seen that whenever the valve spool 34 is moved from its neutral position, the groove in the piston rod 78 connects with one or other of the grooves 75, 76 in the bore 77 to an extent which is proportional to valve movement. This causes a corresponding reduction of pressure in the chamber 69 below the piston 68 which then moves down to increase the opening of the control valve 25. The speed of the pump 17 is therefore increased to meet the increased flow demand for nozzle control.

It is arranged that when the centrifugal pump 17 does not supply sufficient pressure for operation of the control valve unit 28 and the piston 68, this condition occurring during low flow rates to the reheat burners 22, the required fluid pressure is supplied by the main pump 12. For this purpose a branch 83 from the delivery pipe 13 leads through a non-return valve 84 and restrictor 85 to the branch pipe 38 downstream of the non-return valve 39, while a branch 86 upstream of the low pressure supply pipe 11 having a non-return valve 87 and a restrictor 88 therein is connected to the return pipe 43 upstream of the non-return valve 44.

A shut-off valve 89 interposed in the branch supply pipe 16 has a control arm 91 connected to the link 64 whereby the supply of fuel to the inlet of the centrifugal pump 17 is closed when there is no fuel flow demand for the reheat burners 22 and the nozzle control jack 27.

The liquid supply system shown in FIG. 2 is basically similar to that of FIG. 1 and corresponding components of the system such as the main pump and flow control means supplying the main burners, the turbo-driven centrifugal pump supplying the reheat burners, and the auxiliary power circuit including the control valve unit and jack, bear the same reference numerals.

The system includes a shut-off valve 89 having axially spaced ports 80 and 90 between the fuel supply pipe 16 and the inlet of the centrifugal pump 17, and also axially spaced ports 95, 96 between the compressed air supply pipe 24 and the air turbine 23. The ports 90 and 96 are simultaneously openable and closable by lands 97 and 98 respectively of a valve spool 99, under the action of a servo motor piston 101 which is formed on one end of the valve spool 99 and which slides in a cylinder 102.

The port 96 is connected to a control port 103 of an air regulating valve means 104. A valve spool 105 is slidable to vary the opening of the control port 103 and therefore the flow of air through an outlet port 106 to the air turbine 23.

The delivery pipe 18 from the centrifugal pump 17 supplies fuel under pressure to the reheat burners 22 through flow control means. The flow control means is of known form in which the flow of fuel to the burner can be varied by a control lever 107. It includes in the delivery pipe 18 a flow-regulating valve 108 containing a control port 109 the area of which is varied by a valve spool 111. The valve spool is controlled by the fluid pressures in two opposed nozzles 113, 114 of a servo device 112. The latter includes a lever 115 pivoted at 116. The lever extends between the nozzles and it is loaded by an evacuated capsule 117, and by an opposed capsule 118 the fluid pressure in which is varied by movement of the control lever 107. For this purpose the lever 107 operates a control rod 119 carrying a tapered plug 121 which variably throttles an orifice 122. Compressor delivery pressure from the engine is connected to a fixed restrictor 123, and the pressure which prevails in a connection 125 between the fixed restrictor 123 and the variably restricted orifice 122 is applied to the capsule 118 through a pipe 124.

The fuel leaving regulating valve 108 passes through a metering valve 126 between an orifice 127 and a movable plug 128 which is carried by a pivoted lever 129. A resilient torsion rod 132 coaxial with the lever pivot 131 applies a feed-back signal of fluid flow to the lever 115. Servo fluid is applied to the nozzles 113, 114 from a pressure supply pipe 133 having branches with fixed restrictors 134 and 135 therein. The supply pipe 133 is connected to the branch delivery pipe 38 from the centrifugal pump 17 downstream of the non return valve 39.

Since the flow control means is of known kind it is sufficient to say that movement of the control lever 107 varies the fluid pressure in the capsule 118 whereby the spool 111 of the regulating valve 108 is actuated by fluid pressure in the nozzles 113, 114 to regulate the flow of fuel through the control port 109, while the metering valve 126 applies by means of torsion rod 132 a feed back signal of fuel flow to the servo control valve 112 which stablises the reheat fuel flow at a selected value.

The manner in which the flow of air from the engine compressor to the turbine 23 is regulated by the valve 104 will now be described. The valve spool 105 has a control stem 136 connected to the centre pivot 137 of a floating lever 138. A pivot 139 at one end of the lever is operated by a first control device 141 while a pivot 143 at the other end of the floating lever is operated by a second control device 142. The latter has a piston 144 which is servo-controlled by pressure in the pipe 133 acting on one side of the piston, and by a variably controlled pressure and the load of a spring 145 acting on the other face of the piston. The variably controlled pressure is that which exists between a fixed restrictor 146 supplied with servo pressure and a nozzle 147 which is variably restricted by a half ball 148. The half ball is carried by one end of a lever 149 which has a central pivot 151. The other end of the lever is acted upon by the spring 145 through a push rod 152, and in the opposite direction by a spring 153 the load of which is varied by movement of the rod 119.

When the lever 107 is turned clockwise to increase fuel flow, the increased load in spring 153 causes the lever 149 to lift the half ball 148 from the nozzle 147 whereby fluid pressure falls at the right-hand end of piston 144. Considering the pivot 139 to be stationary at that time, movement of the piston 144 to the right will cause the valve spool 105 to increase the opening of the control port 103, thereby increasing the air supply to turbine 23 and increasing the power driving the centrifugal pump 17. As the piston 144 moves to the right, the load of spring 145 is increased and the push rod 152 acting on the lever 149 tends to restore the closing load of the half ball 148 on the nozzle 147. The piston 144 therefore stabilises in a new position, and the valve spool 105 similarly stabilises in a new position giving increased air supply in accordance with the position of the control lever 107.

The second flow control device 142 includes a pilot valve 154 which is operated by the control lever 107 to cause opening of the shut-off valve 89 at the beginning of movement of the lever 107 from its zero flow position 107'. When the lever is in this position the valve 154 connects low pressure to a pipe 155 which extends from a chamber 156 at the left hand end of the piston 101. This chamber is connected to the pressure supply pipe 133 through a fixed restrictor 157. The right hand end of the piston 101 is vented to low pressure, but a spring 158 acts in the absence of fluid pressure in the chamber 156 to hold the valve spool 99 in the position closing both the fuel supply port 90 and the air supply port 96. When the control lever is first moved from the position 107', the pilot valve 154 closes whereby supply pressure acts in the chamber 156 to move the valve spool 99 in opposition to the load of spring 158, thus opening the port 90 and the port 96.

The first control device 141 has a piston 159 which is acted upon at its left-hand end by supply pressure in the pipe 133, and which is acted upon at its right-hand end by a spring 161 and by a variable fluid pressure. This variable pressure is that which prevails downstream of a fixed restrictor 162 in a pipe 163 which is connected between the pressure supply pipe 133 and the axially spaced grooves 75, 76 in the bore 77 of the valve unit 28. When the valve spool 34 is in its neutral position, the groove 79 lies between and isolated from the grooves 75 and 76. The supply pressure in pipe 133 then acts on the right-hand end of the piston 159 to maintain the latter in its end position to the left-hand side in the drawing. When the valve spool 34 moves in either direction so that the groove 79 is partially open either to the groove 75 or to the groove 76 there is a fall of pressure at the right-hand end of the piston 159. The piston therefore moves towards the right-hand side of the drawing, causing a proportional movement of the central pivot 137. The spool 105 thus increases the opening of the control port 103 of the air-regulating valve 104 whereby there is an increase of power driving the centrifugal pump 17 when fluid power is required for operating the jack 27.

The air-regulating valve 104 is therefore adjusted by the summing device 138 to vary the fluid power supplied to the air turbine 23 in accordance with the total fuel flow to the nozzle control jacks 27 and to the reheat burners 22, the flow demand of the jacks 27 being transmitted to the valve 104 by a control connection which includes the pipe 163 and control device 141, and the reheat flow demand being transmitted to the valve 104 by a control connection which includes the control rod 119 and the control device 142.

I claim:

1. A liquid fuel supply system for a gas turbine engine comprising:
   (A) a centrifugal pump (17) arranged to supply liquid fuel under pressure to burner means (22) and for operation of an auriliary power service (27),
   (B) fluid-operated drive means (23) for the pump,
   (C) valve means (104) operable to vary the flow of fluid supplied to the drive means,
   (D) a first flow control means (107, 121) operable to regulate the flow of fuel to the burner means, and
   (E) a second flow control means (28, 34) operable to regulate the flow of fuel to the auxiliary power service (27), the valve means (104) being arranged to vary the flow of fluid supplied to the drive means (23) in accordance with the flow of fuel demanded by the first flow control means (107, 121) and the flow of fuel demanded by the second flow control means (28, 34).

2. A liquid fuel supply system according to claim 1, including:
   (A) a first control device (142) adapted to provide a signal of flow demand in accordance with flow-selecting movement of a movable element (121) of the first control means,
   (B) a second control device (141) adapted to provide a signal of flow demand in accordance with the flow-selecting movement of a movable element (34) of the second control means, and
   (C) a summing device (138) responsive to both signals of flow demand and operative on the valve means (104) to vary the flow of fluid supplied to the drive means (23) in accordance with the total fuel flow demand for the burner means (22) and for the auxiliary power service (27).

3. A liquid fuel supply system according to claim 2, wherein the first control device (142) includes a piston (144) providing a positional signal of flow demand, and the second control device (141) includes a piston (159) providing a positional signal of flow demand, while the summing device (138) comprises a lever having connections at three positions along its length, at one of which one of the pistons is connected, at a second of which the other of the pistons is connected, and at a third of which a connection is made to the valve means (104).

4. A liquid fuel supply system according to claim 1, including:
   (A) a shut-off valve (89) interposed in the supply (16) fluid to the inlet of the centrifugal pump (17) and in the supply (24) of operating fluid to the drive means (23),
   (B) a pilot valve (154, 155) operable by the first flow control means (107), and (C) a servomotor (101) controlled by the pilot valve to operate the shut-off valve (89), whereby the shut-off valve is closed when the first flow control means (107) selects zero flow to the burner means (22), and is opened during the initial stage of flow selection.

5. A liquid fuel supply system according to claim 1, wherein the fluid-operated drive means (23) comprises an air turbine which is supplied with compressed air from the compressor stage of the engine.

References Cited

UNITED STATES PATENTS

| 2,699,037 | 1/1955 | Davies et al. | 60—237 |
| 2,729,061 | 1/1956 | Grafinger et al. | 60—39.28 |
| 2,739,442 | 3/1956 | Neal et al. | 60—39.18(c)UX |
| 2,742,755 | 4/1956 | Davies et al. | 60—241 |
| 3,082,599 | 3/1963 | White et al. | 60—237 |
| 3,095,702 | 7/1963 | Brown et al. | 60—241UX |
| 3,391,541 | 7/1968 | Tyler | 60—235 |

FOREIGN PATENTS

| 224,652 | 1/1959 | Australia | 60—235 |

AL LAWRENCE SMITH, Primary Examiner

U.S. Cl. X.R.

60—235, 241